Sept. 21, 1926.
P. W. LENZ
1,600,344
MACHINE FOR TRIMMING SHOE LININGS
Filed Jan. 25, 1926
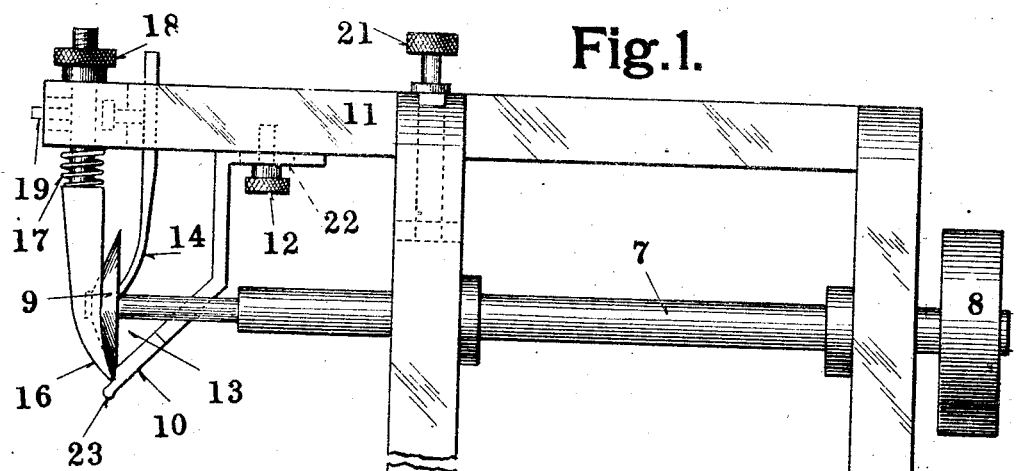
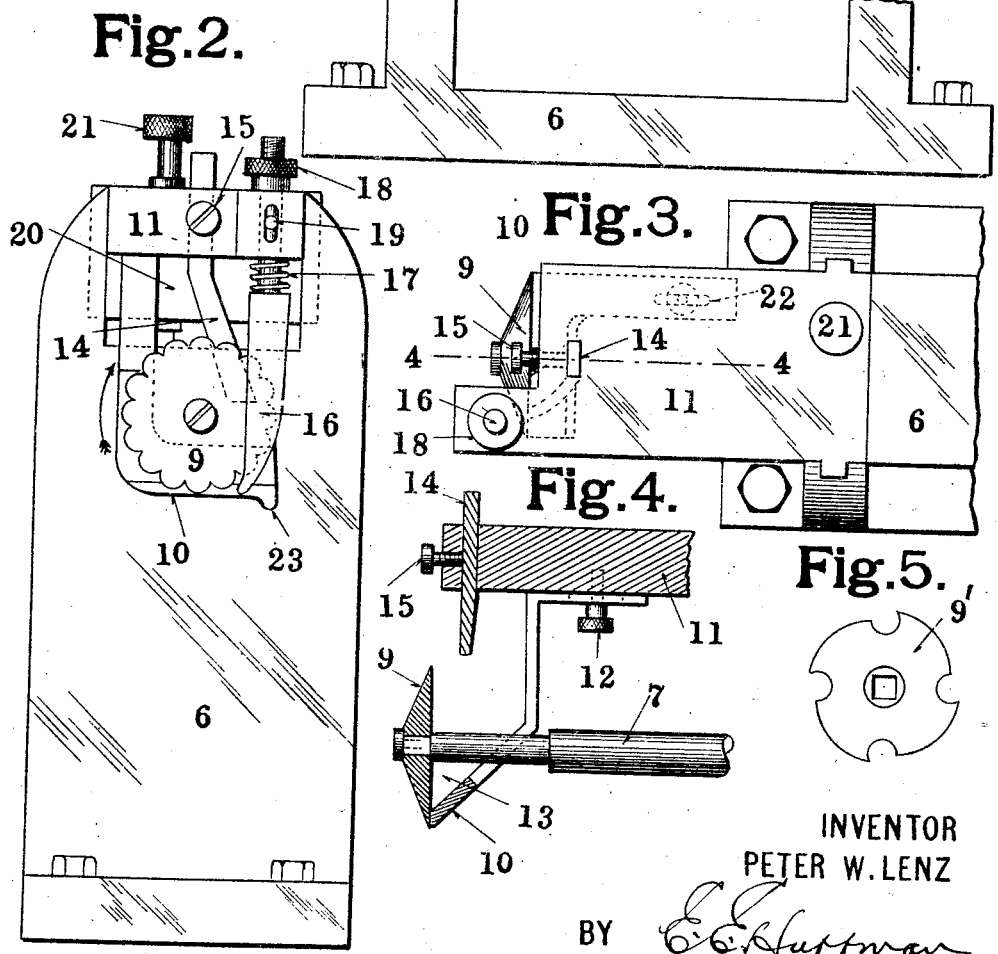
INVENTOR
PETER W. LENZ
BY
ATTORNEY Patented Sept. 21, 1926.

1,600,344

UNITED STATES PATENT OFFICE.

PETER W. LENZ, OF BELLEVILLE, ILLINOIS.

MACHINE FOR TRIMMING SHOE LININGS.

Application filed January 25, 1926. Serial No. 83,487.

My invention relates to a machine for trimming the lining of shoes and particularly to trimming the lining between the upper and sole of unturned shoes. Heretofore machines for this purpose have been provided in which the cutter working between the sole and upper of the shoe cooperated with a roll or other shearing device placed on the opposite side of the sole, thus necessitating the entrance of the cutter a certain distance into the sole to insure the severance of the lining. The principal object of my invention is to provide a machine in which the cutter and its cooperating shearing member, preferably in the form of a blade, both enter the space between the upper and sole, thus severing the lining without any cutting and consequent weakening of the sole.

In the accompanying drawings, which illustrate a machine made in accordance with my invention, Figure 1 is a side elevation; Figure 2 is a front view; Figure 3 is a top plan view of the front end of the machine; Figure 4 is a section taken on the line 4—4 of Figure 3; and Figure 5 is a view showing a modified form of cutter.

The frame of the machine indicated at 6 is adapted to be secured to a work bench and has journaled in it a shaft 7. Secured to the rear end of the shaft 7 is a pulley 8 by means of which it may be driven at a high rate of speed. Carried on the front end of the shaft is a rotary cutter 9, preferably formed with a serrated edge. The formation of serrations in the edge of the cutter not only increases its effectiveness as a cutting tool, but also assists in feeding the work owing to its tendency to draw the work along in the direction in which its lower edge is moving. One form of serrations is shown in the cutter 9 (Figure 2) and another in the modified cutter 9' (Figure 5). Various other forms may be used. Cooperating with the rear face of the cutter is a combined guard and shearing member preferably in the form of a blade 10 extending upwardly from the lower edge of the cutter at an angle of about 45 degrees so as to form between the cutter and blade a passageway 13 for the severed lining. The blade 10 is secured to an arm 11 of the frame by a screw 12 passing through a slot 22 in a horizontal portion of the blade so that the blade may be readily moved away from the cutter in order that the latter may be removed for grinding, etc. The front end of the shearing blade is provided with a short finger 23 to assist in picking up the lining when the work is started. A scraper 14 is secured in the arm 11 by a screw 15. This scraper prevents adhesion of the severed lining to the face of the cutter. Arranged at the front of the cutter is a guard 16 for preventing contact of the upper of the shoe with the edge of the cutter. The upper end of this guard is slidingly mounted in the arm 11 and is surrounded by a coil spring 17 so that it may yield when passing over inequalities in the work. A knurled nut 18 adjusts the height of the guard. A pin 19 working in a slot prevents rotation of the guard while allowing the necessary vertical movement. The arm 11 may be made integral with the frame 6. I prefer, however, to make it separate and mount it on a slide 20 moving in grooves in the frame and vertically adjustable by means of a screw 21 having a knurled head. By this construction the lower edge of the shearing blade may be accurately adjusted to cutters of different diameters.

In the operation of my machine the cutter, shearing blade and guard 16 are all inserted in the space formed by separating the outer edges of the upper and lining of the shoe. The lining is picked up by the finger 23, the severed portion escaping through the passage way 13. Injury to the sole is prevented by the blade 10 and to the upper by the guard 16. The work is fed toward the left hand side of the machine (Figure 2) by the operator, such movement being greatly assisted, as heretofore pointed out, by the serrations in the edge of the blade.

Having fully described my invention, what I claim as new and desire to secure by Letters Patent of the United States is:

1. In a machine for trimming the lining between the upper and sole of a shoe, the combination with a cutter, of a shear member cooperating therewith, said cutter and shear member being angularly related, whereby their cooperating edges may extend between the upper and sole to sever the lining along a line substantially back of the edge of the sole.

2. In a machine for trimming the lining between the upper and sole of a shoe, the combination with a rotary cutter, of a shear member cooperating therewith, said cutter and shear member being angularly related, whereby their cooperating edges may extend between the upper and sole to sever the lining along a line substantially back of the edge of the sole.

3. In a machine for trimming the lining between the upper and sole of a shoe, the combination with a rotary cutter, of a shear member cooperating therewith, both said cutter and shear member being adapted to extend between the upper and sole, said parts being arranged at an angle to each other to form a passage way for the severed lining between them.

4. In a machine for trimming the lining between the upper and sole of a shoe, the combination with a rotary cutter, of a cooperating shear member arranged at one side of said cutter and forrming a guard, and a second guard arranged at the other side of said cutter, all said parts being adapted to extend between the upper and sole.

5. In a machine for trimming the lining between the upper and sole of a shoe, the combination with a rotary cutter, of a shear member cooperating therewith, both said cutter and shear member being adapted to extend between the upper and sole, and a scraper to prevent adhesion of the severed lining to the cutter.

6. In a machine for trimming the lining between the upper and sole of a shoe, the combination with a cutter, of a shear blade cooperating therewith, both said cutter and blade being adapted to extend between the upper and sole, and a finger on the blade to pick up the lining.

7. In a machine for trimming the lining between the upper and sole of a shoe, the combination with a cutter, of a cooperating shear blade arranged at one side thereof and also acting as a guard, a second guard arranged at the other side of said cutter, and a finger on said shear blade for picking up the lining, said finger projecting forward of said second guard.

8. In a machine for trimming the lining between the upper and sole of a shoe, the combination with a rotary cutter having a serrated edge, of a cooperating shear blade arranged at one side of said cutter and arranged at an angle thereto to form a passage way for the severed lining, a scraper to prevent adhesion of the lining to the cutter, and a yielding guard arranged at the other side of said cutter.

9. A machine for trimming the lining between the upper and sole of a shoe along a line between the edge of the sole and the seam connecting the upper and sole, which comprises a cutter, means for deflecting the edge of the upper out of the path of the cutter, and a guard member so positioned with relation to the cutter that the latter is prevented from contacting with the sole.

10. In a machine for trimming the lining between the upper and sole of a shoe, the combination with a cutter, of a cooperating shear blade arranged at one side thereof and acting as a guard to prevent contact of the cutter with the sole, and a second guard arranged at the other side of said cutter to prevent its contact with the upper.

11. In a machine for trimming the lining between the upper and sole of a shoe, the combination with a rotary cutter contacting with one side of the lining, of a shear member contacting with the other side of the lining, said cutter and shear member being arranged at an acute angle to each other and forming a passage-way between them for the severed lining.

12. In a machine for trimming the lining between the upper and sole of a shoe, the combination with a rotary cutter contacting with one side of the lining, of a shear member contacting with the other side of the lining, said cutter and shear member being arranged at an angle to each other and forming a passage-way between them for the severed lining, and a guard situated at the opposite side of the cutter from the shear member.

13. In a machine for trimming the lining between the upper and sole of a shoe, the combination with a rotary cutter contacting with one side of the lining, of a cooperating shear member contacting with the other side of the lining, said cutter and shear member being arranged at an angle to each other to form a passage-way for the severed lining, and a scraper for removing adhering lining from the cutter.

14. In a machine for trimming the lining between the upper and sole of a shoe, the combination with a cutter, of a guard to prevent contact of the cutter with the sole, and a yielding guard arranged at the other side of said cutter to prevent its contact with the upper.

In testimony whereof, I hereunto affix my signature, this 21st day of January, 1926.

PETER W. LENZ.